United States Patent [19]

Ishizuka et al.

[11] 4,097,824

[45] Jun. 27, 1978

[54] VARIABLE EQUALIZER

[75] Inventors: Kohei Ishizuka; Yasuhiro Kita, both of Hachioji; Yoshitaka Takasaki; Junichi Nakagawa, both of Tokorozawa, all of Japan

[73] Assignee: Hitachi, Ltd., Japan

[21] Appl. No.: 772,677

[22] Filed: Feb. 28, 1977

[30] Foreign Application Priority Data

Mar. 1, 1976 Japan .................................. 51-21144

[51] Int. Cl.² .......................................... H03H 7/14
[52] U.S. Cl. ................................. 333/28 R; 330/260; 330/294; 330/295
[58] Field of Search .................. 333/28 R; 328/160; 330/260, 294, 295

[56] References Cited

U.S. PATENT DOCUMENTS 3,559,113  1/1971  Fjallbrant .................... 333/28 R X
3,559,114  1/1971  Fjallbrant .................... 333/28 R X

FOREIGN PATENT DOCUMENTS 1,308,877  3/1973  United Kingdom ............. 333/28 R

*Primary Examiner*—Paul L. Gensler
*Attorney, Agent, or Firm*—Craig & Antonelli

[57] ABSTRACT

A variable equalizer adapted to be fabricated in an integrated circuit structure and having improved compensation characteristics comprises a parallel connection of two circuits, one including a series connection of a first impedance circuit (impedance: Zy) and an input A.C. signal source circuit having a voltage $v_i$, the other comprising a series connection of a second impedance circuit (impedance: $Z_x$) and an A.C. signal source circuit having a voltage amplitude $v_z$ which is equal to $v_i(K/Z_y)^2$, where K is a constant, and the second impedance circuit, consists of a variable resistor.

4 Claims, 5 Drawing Figures

F I G. 1
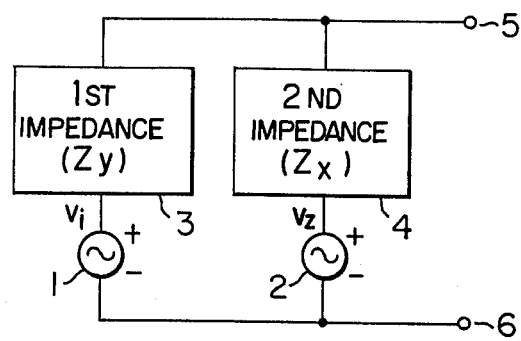
F I G. 2
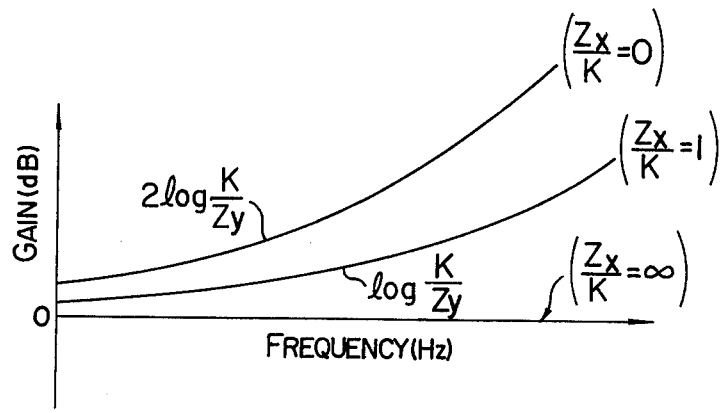

VARIABLE EQUALIZER

BACKGROUND OF THE INVENTION

1. Field of the Invention

The present invention relates to a variable equalizer, and more particularly to a variable equalizer adapted to be used with a transmission line to compensate for its frequency characteristics when the latter change.

2. Description of the Prior Art

Many types of variable equalizers for use in a communication transmission line have been known, typical one of which is a Bode type variable equalizer, which has an advantage that its frequency characteristics can be adjusted by adjusting a single resistor. (See the article "Variable Equalizer" by H. W. Bode, Bell System Technical Journal, Vol. 17, No. 2, pp. 229– 244, 1938)

However, since the variable equalizer of this type uses many inductance elements in the circuit construction, it is difficult to fabricate it in an integrated circuit structure and hence it cannot meet the requirement of minituarization of the device. Other known variable equalizers generally have complex circuit configurations. For example, a number of feedback circuits are used in the circuit construction or a plurality of elements which require adjustment are used. While a simple construction which does not use inductive elements has been known, it does not provide satisfactory frequency characteristics.

SUMMARY OF THE INVENTION

It is a general object of the present invention to provide a variable equalizer which is compact in size, easy in the adjustment of the frequency characteristics and provide improved frequency compensation characteristics.

It is a specific object of the present invention to provide a variable equalizer which has a single resistive element for adjusting the frequency characteristics and has no inductive element to enable the variable equalizer to be fabricated in an integrated circuit structure.

In order to achieve the above objects, the present invention uses a circuit configuration with respect to an A.C. signal comprising a first series circuit of an input A.C. signal voltage source circuit and a first impedance circuit, and a second series circuit of a second A.C. signal voltage source circuit and a second impedance circuit, the first and second series circuits being connected in parallel to each other, and output terminals being connected across the parallel connection, the second impedance circuit consisting of only a resistive component, the resistance of which is variable, the voltage of the second A.C. signal voltage source circuit being selected to be proportional to a product of the voltage of the input signal voltage source circuit and a square of a reciprocal of the impedance of the first impedance circuit.

With the arrangement described above, since the circuit for the adjustment of the frequency characteristics consists of only the second impedance circuit which, in turn, consists of only a resistive component, the adjustment of the frequency characteristics can be facilitated and a desired frequency control can be attained over an entire frequency range involved without using any feedback circuit. Furthermore, the first impedance circuit can be constructed only by capacitive and resistive components without using an inductive component, the entire circuit can be constructed in an integrated circuit structure. Accordingly, a small size and economic variable equlizer can be attained.

The above and other objects, features and advantages of the present invention will be apparent from the following description of the preferred embodiments of the invention when taken in conjunction with the accompanying drawings.

BRIEF DESCRIPTION OF THE DRAWINGS

FIG. 1 is a block diagram illustrating a basic construction of the present invention.

FIG. 2 shows frequency characteristics for illustrating the principle of operation of a variable equalizer.

DESCRIPTION OF THE PREFERRED EMBODIMENTS

Figure 3:
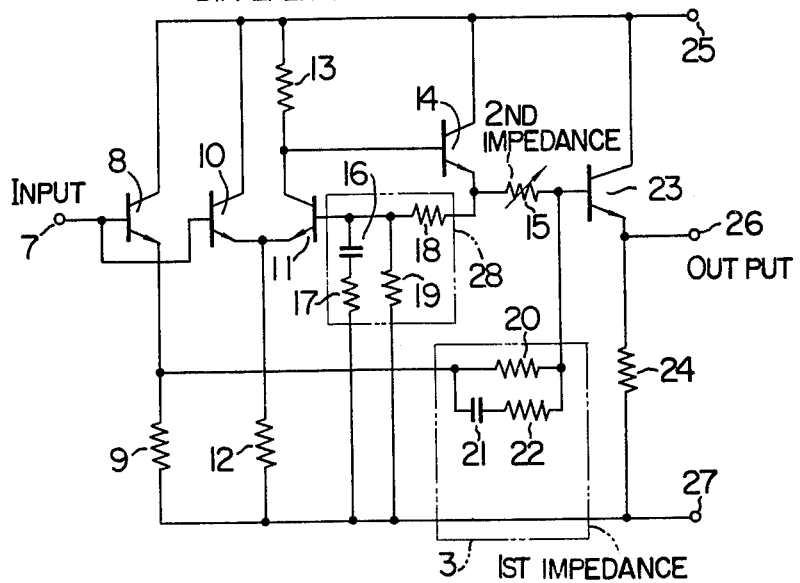
FIG. 3 shows a circuit diagram of a variable equalizer in accordance with one embodiment of the present invention.

FIG. 1 shows a block diagram illustrating a basic construction of the present invention. An input signal voltage source circuit 1 having a voltage $v_i$ is connected to an impedance circuit 3 having an impedance $Z_y$ to form a first series circuit. A second A.C. signal voltage source circuit 2 having a voltage $v_z$ is connected to a second impedance circuit 4 having an impedance $Z_x$ to form a second series circuit. The first and second series circuits are connected in parallel with each other to provide an equalized output across output terminals 5 and 6.

Lets assume that the voltage $v_z$ of the A.C. signal voltage source circuit 2 is set to $$v_z = (K^2/Z_y^2)v_i$$

where $K$ is a constant. Then, the voltage $v_o$ appearing across the output terminals 5 and 6 is given by:

$$\frac{v_o}{v_i} = \frac{1}{\frac{Z_y}{K}} \cdot \frac{\frac{Z_x}{K} \cdot \frac{Z_y}{K} + 1}{\frac{Z_x}{K} + \frac{Z_y}{K}} \qquad (1)$$

It is well known that the frequency characteristics of the equation (1) represent those of a variable equalizer when the impedance $Z_y$ is imparted with a given frequency characteristic over a frequency range involved, e.g. a gain characteristic which is proportional to the square root of the frequency, and the impedance $Z_x$ is independent of the frequency. (Reference is made, for example, to the article described above.)

In order to facilitate the understanding of the present invention, a brief explanation is given below to explain that the frequency characteristics of the equation (1) represent those of a variable equalizer.

FIG. 2 schematically shows the frequency characteristics of the equation (1), in which the ordinate represents the gain in a logarithmic scale and the abscissa represents the frequency.

Assuming that $Z_x/K = 1$, the gain $v_o/v_i$ of the equation (1) will be equal to $K/Z_y$ and logarithmic representative thereof is given by $\log K/Z_y$. Then, the impedance $Z_y$ is designed such that the overall frequency characteristics of a combination of the equalizer and a transmission line with which the equalizer is associated is flat over the frequency range involved. Assuming that $Z_x/K = \infty$, the gain $v_o/v_i$ of the equation (1) will be $v_o/v_i = 1$ and the logarithmic representation thereof is zero irrespective of the frequency. That is, it coincides with the 0 dB abscissa. On the other hand, assuming that $Z_x/K = 0$, the gain of the equation (1) will be $v_o/v_i = (K/Z_y)^2$ and the logarithmic representation thereof is given by $2 \log(K/Z_y)$ which is represented by a curve having a coefficient twice as large as that of the curve for $Z_x/K = 1$. Thus, by changing the impedance $Z_x$ around the constant K, the frequency characteristics of the equalizer can be controlled.

Figure 4:
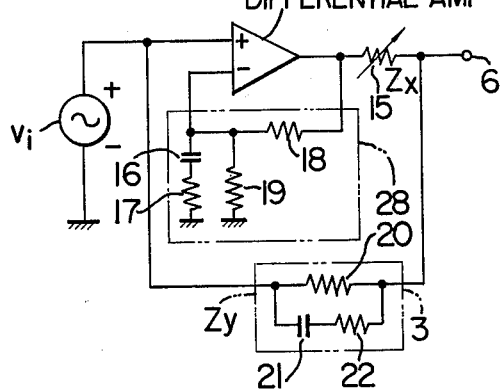
FIG. 4 shows an equivalent circuit diagram of the circuit of FIG. 3 with respect to an A.C. signal component.

FIG. 3 shows a circuit diagram of one embodiment of the variable equalizer in accordance with the present invention and FIG. 4 shows an equivalent circuit thereof with respect to an A.C. signal component.

An input signal to be equalized in the form of an A.C. voltage is applied to an input terminal 7. A portion of the input signal is applied to the base of a transistor 8. A signal appears across a load resistor 9 connected between an emitter of the transistor 8 and a D.C. power supply terminal 27. An A.C. component of the signal across the load resistor 9 corresponds to the voltage of the source circuit 1 in FIG. 1. This A.C. input signal is then applied to the base of a transistor 23 through an impedance circuit 3 (which corresponds to the first impedance circuit 3 in FIG. 1) including resistors 20 and 22 and a capacitor 21. Another portion of the input signal to the input terminal 7 is applied to the base of a transistor 10 which, together with a transistor 11 and resistors 12 and 13, constitute a differential amplifier. An output signal of the differential amplifier is taken from a load resistor 13 connected between the collector of the transistor 11 and a D.C. power supply terminal 25, and applied to the base of a transistor 23 through a base-emitter junction of a transistor 14 and a variable resistor 15. A portion of an output signal at the emitter of the transistor 14 is applied to the base of the transistor 11 of the differential amplifier as the other input thereto through an impedance circuit 28 including resistors 17, 18 and 19 and a capacitor 16. Here, the differential amplifier, the impedance circuit 28 and the transistor 14 correspond to the A.C. signal voltage source circuit 2 in FIG. 1, the variable resistor 15 corresponds to the second impedance circuit 4 in FIG. 1, and the output terminals 26 and 27 correspond to the output terminals 5 and 6 in FIG. 1. The terminals 25 and 27 are D.C. power supply terminals for supplying an operation voltage to the circuit components.

An equivalent circuit of FIG. 3 with respect to the A.C. signal is shown in FIG. 4 in which the same circuit components as those in FIG. 3 bear the same reference numerals.

In FIG. 4, lets assume that the amplitude of the input A.C. signal voltage is $v_i$, the gain of the differential amplifier is G, the transfer function of the impedance circuit 28 is $(Z_y/K)^2$, the impedance of the impedance circuit 3 is $Z_y$, and the resistance of the variable resistor 15 is $Z_x$. Then, the output voltage $v'$ of the differential amplifier is given by:

$$v' = G\{v_i - (\frac{Z_y}{K})^2 v'\}$$

$$= \frac{v_i}{\frac{1}{G} + (\frac{Z_y}{K})^2}$$

When the gain G of the differential amplifier is established such that it meets a relation of $$1/G << (Z_y/K)^2$$

then, the output voltage $v'$ is given by $$v' \doteq (K/Z_y)^2 v_i$$

Accordingly, the circuit of FIG. 4 is essentially identical to the circuit of FIG. 1 and it functions as the variable equalizer.

The magnitudes of the resistances and the capacitances in the above embodiment may be determined depending on the characteristics of the transmission line to which the present invention is applied and the range of compensation required.

Figure 5:
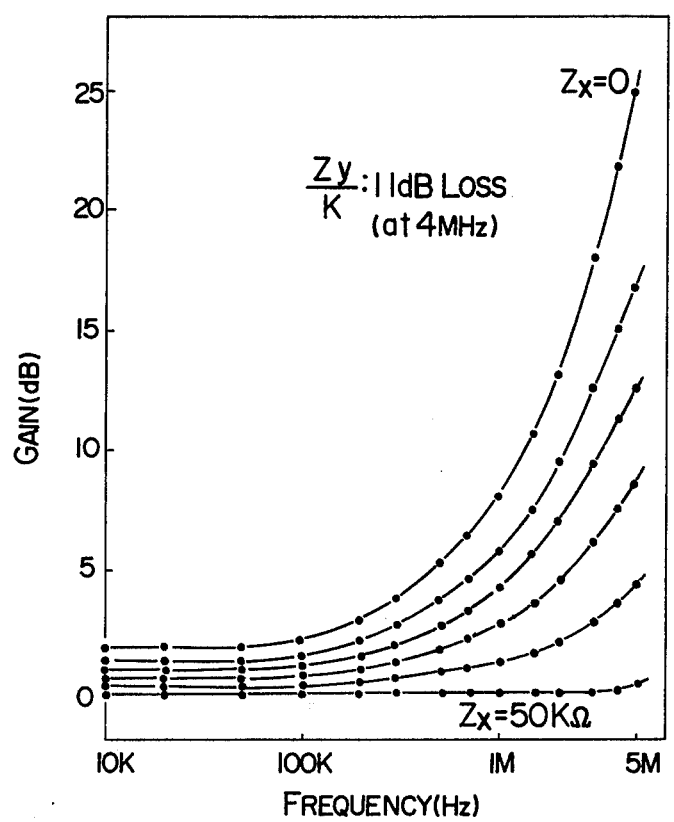
FIG. 5 shows frequency characteristics of the equalizer shown in FIG. 3.

FIG. 5 shows frequency characteristics actually measured in the embodiment shown in FIG. 3 under the conditions of a frequency range of 0 – 5 MHz, a variable range of the variable resistor 15 ($=Z_x$) of 0 – 50 KΩ, and the magnitude $\log Z_y/K$ of 11 dB at 4 MHz for the reference frequency characteristic, that is, for the frequency characteristic of $Z_y/K$ when $Z_x/K = 1$.

While specific embodiments of the present invention have been shown and described, it should be understood that the present invention is not limited to the above embodiments. The design of the impedance circuits 3 and 28 may be changed in various ways depending on the characteristics of the transmission line to which the present invention is applied, and the variable resistor 15 may be constructed by a variable resistance device such as a field effect transistor (FET) to permit electrical control of the variable equalizer.

We claim:
1. A variable equalizer comprising:
   a first series circuit of a first input A.C. signal voltage source circuit and a first impedance circuit; and
   a second series circuit of a second signal voltage source circuit and a second impedance circuit, said second signal voltage source circuit having a voltage which is proportional to a product of the A.C. voltage of said first input signal voltage source circuit and the square of the reciprocal of the impedance of said first impedance circuit;
   said first and second series circuits being connected in parallel with each other.
2. A variable equalizer according to claim 1, wherein said second impedance circuit consists of a resistive component, the resistance of said second impedance circuit being variable.
3. A variable equalizer according to claim 1, wherein said first impedance circuit consists of a resistive component and a capacitive component.
4. A variable equalizer according to claim 1, wherein said second signal voltage source circuit comprises a differential amplifier having first and second input terminals and an output terminal and a third impedance circuit having a transfer function which is proportional to the square of the impedance of said first impedance circuit, the input signal being applied to said first input terminal and an output signal from said third impedance circuit being applied to said second input terminal, an input terminal of said third impedance circuit being connected to an output terminal of said differential amplifier.

* * * * *